(12) United States Patent
Mukhi et al.

(10) Patent No.: US 11,715,470 B2
(45) Date of Patent: Aug. 1, 2023

(54) METHOD AND SYSTEM FOR TRACKING IN EXTENDED REALITY

(71) Applicant: TRANSFR Inc., New York, NY (US)

(72) Inventors: Nirmal Khubchand Mukhi, Ramsey, NJ (US); Darren Thomas McAuliffe, Austin, TX (US); Michael Joseph Colombo, Brooklyn, NY (US); Bharani Rajakumar, New York, NY (US); Barry Steven Watson, Jr., Coral Springs, FL (US)

(73) Assignee: TRANSFR Inc., New York, NY (US)

( * ) Notice: Subject to any disclaimer, the term of this patent is extended or adjusted under 35 U.S.C. 154(b) by 194 days.

(21) Appl. No.: 17/212,653

(22) Filed: Mar. 25, 2021

(65) Prior Publication Data

US 2022/0310087 A1 Sep. 29, 2022

(51) Int. Cl.
| | |
|---|---|
| *G10L 15/22* | (2006.01) |
| *G06F 3/01* | (2006.01) |
| *G10L 15/18* | (2013.01) |
| *G10L 15/26* | (2006.01) |

(52) U.S. Cl.
CPC ............ *G10L 15/22* (2013.01); *G06F 3/011* (2013.01); *G10L 15/1815* (2013.01); *G10L 15/26* (2013.01); *G10L 2015/223* (2013.01)

(58) Field of Classification Search
CPC ................................. G10L 15/22; G10L 15/26
See application file for complete search history.

(56) References Cited

U.S. PATENT DOCUMENTS

| 9,424,840 B1 | 8/2016 | Hart et al. | |
|---|---|---|---|
| 10,762,903 B1 | 9/2020 | Kahan et al. | |
| 2015/0348551 A1* | 12/2015 | Gruber | G10L 15/1822 |
| | | | 704/235 |
| 2018/0047395 A1* | 2/2018 | Sommers | H04N 7/157 |
| 2019/0043004 A1* | 2/2019 | Lesieur | G06Q 10/087 |

(Continued)

FOREIGN PATENT DOCUMENTS

AU  2015266863 B2  3/2018

OTHER PUBLICATIONS

Extended European Search Report from corresponding EP Application No. 22163585 dated Aug. 29, 2022.

(Continued)

*Primary Examiner* — Ibrahim Siddo
(74) *Attorney, Agent, or Firm* — DLA Piper LLP (US)

(57) ABSTRACT

A computing system generates an extended reality environment for an end user. The extended reality environment includes a plurality of tasks and a plurality of goals to be achieved by the end user. The computing system receives input data from an extended reality system associated with the end user. The computing system updates a progress of the end user through the plurality of tasks and the plurality of goals based on the input data. The computing system receives a voice command from the end user. The voice command corresponds to a statement uttered by the end user within the extended reality environment. The computing system processes the voice command to generate a response to the voice command. The computing system causes the response to appear within the extended reality environment as an audible, visual or haptic feedback response to the voice command.

20 Claims, 7 Drawing Sheets

(56) References Cited

U.S. PATENT DOCUMENTS

| | | |
|---|---|---|
| 2019/0066529 A1 | 2/2019 | Grubbs |
| 2019/0384762 A1 | 12/2019 | Hill et al. |
| 2020/0082735 A1 | 3/2020 | Nel et al. |
| 2020/0160746 A1 | 5/2020 | Belch et al. |
| 2020/0183928 A1 | 6/2020 | Wu |
| 2021/0004885 A1 | 1/2021 | Abitbol et al. |

OTHER PUBLICATIONS

Jagneux, David (UploadVR), "Star Trek: Bridge Crew is keeping IBM's Watson on its duty roster", Mar. 31, 2018, https://venturebeat.com/2018/03/31/star-trek-bridge-crew-is-keeping-ibms-watson-on-its-duty-roster/.

Kopp, Stefan et al., "Max—A Multimodal Assistant in Virtual Reality Construction", Jan. 2003, https://www.techfak.uni-bielefeld.de/~skopp/download/Max-KI_ECA.pdf.

Gris, Ivan et al., "Young Merlin: An Embodied Conversational Agent in Virtual Reality", *ICMI'16*, Nov. 12-16, 2016, Tokyo, Japan, pp. 425-426.

Anabuki, Mahoro, et al., "Welbo: an embodied conversational agent living in mixed reality space, *CHI EA '00: CHI '00 Extended Abstracts on Human Factors in Computing Systems*", Apr. 2000, pp. 10-11.

\* cited by examiner

METHOD AND SYSTEM FOR TRACKING IN EXTENDED REALITY

FIELD OF THE DISCLOSURE

The present disclosure generally relates to a method and a system for integrating artificial intelligence within an extended reality experience.

BACKGROUND

As extended reality (XR) technology continues to rapidly improve, the applications of XR technology to existing fields continues to grow. Virtual reality technology may be implemented into a variety of fields to help train users or workers to achieve a specific goal or learn a specific task.

SUMMARY

In some embodiments, a computer-implemented method is disclosed herein. A computing system generates an extended reality environment for an end user. The extended reality environment includes a plurality of tasks and a plurality of goals to be achieved by the end user. The computing system receives input data from an extended reality system associated with the end user. The input data includes at least event data associated with actions taken by the end user in the extended reality environment. The computing system updates a progress of the end user through the plurality of tasks and the plurality of goals based on the input data. The computing system receives a voice command from the end user. The voice command corresponds to a statement uttered by the end user within the extended reality environment. The computing system processes the voice command to generate a response to the voice command. The computing system causes the response to appear within the extended reality environment as an audible, visual or, haptic feedback response to the voice command.

In some embodiments, a non-transitory computer readable medium is disclosed herein. The non-transitory computer readable medium includes one or more sequences of instructions, which, when executed by one or more processors, may cause a computing system to perform operations. The operations include generating, by the computing system, an extended reality environment for an end user. The extended reality environment includes a plurality of tasks and a plurality of goals to be achieved by the end user. The operations further include receiving, by the computing system, input data from an extended reality system associated with the end user. The input data includes at least event data associated with actions taken by the end user in the extended reality environment. The operations further include updating, by the computing system, a progress of the end user through the plurality of tasks and the plurality of goals based on the input data. The operations further include receiving, by the computing system, a voice command from the end user. The voice command corresponds to a statement uttered by the end user within the extended reality environment. The operations further include processing, by the computing system, the voice command to generate a response to the voice command. The operations further include causing, by the computing system, the response to appear within the extended reality environment as an audible, visual, or haptic feedback response to the voice command.

In some embodiments, a system is disclosed herein. The system includes a processor and a memory. The processor is in communication with an extended reality device. The memory has programming instructions stored thereon, which, when executed by the processor, causes the system to perform operations. The operations include generating an extended reality environment for an end user. The extended reality environment includes a plurality of tasks and a plurality of goals to be achieved by the end user. The operations further include receiving input data from an extended reality system associated with the end user. The input data includes at least event data associated with actions taken by the end user in the extended reality environment. The operations further include updating a progress of the end user through the plurality of tasks and the plurality of goals based on the input data. The operations further include receiving a voice command from the end user. The voice command corresponds to a statement uttered by the end user within the extended reality environment. The operations further include processing the voice command to generate a response to the voice command. The operations further include causing the response to appear within the extended reality environment as an audible, visual, or haptic feedback response to the voice command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

DETAILED DESCRIPTION

Figure 1:
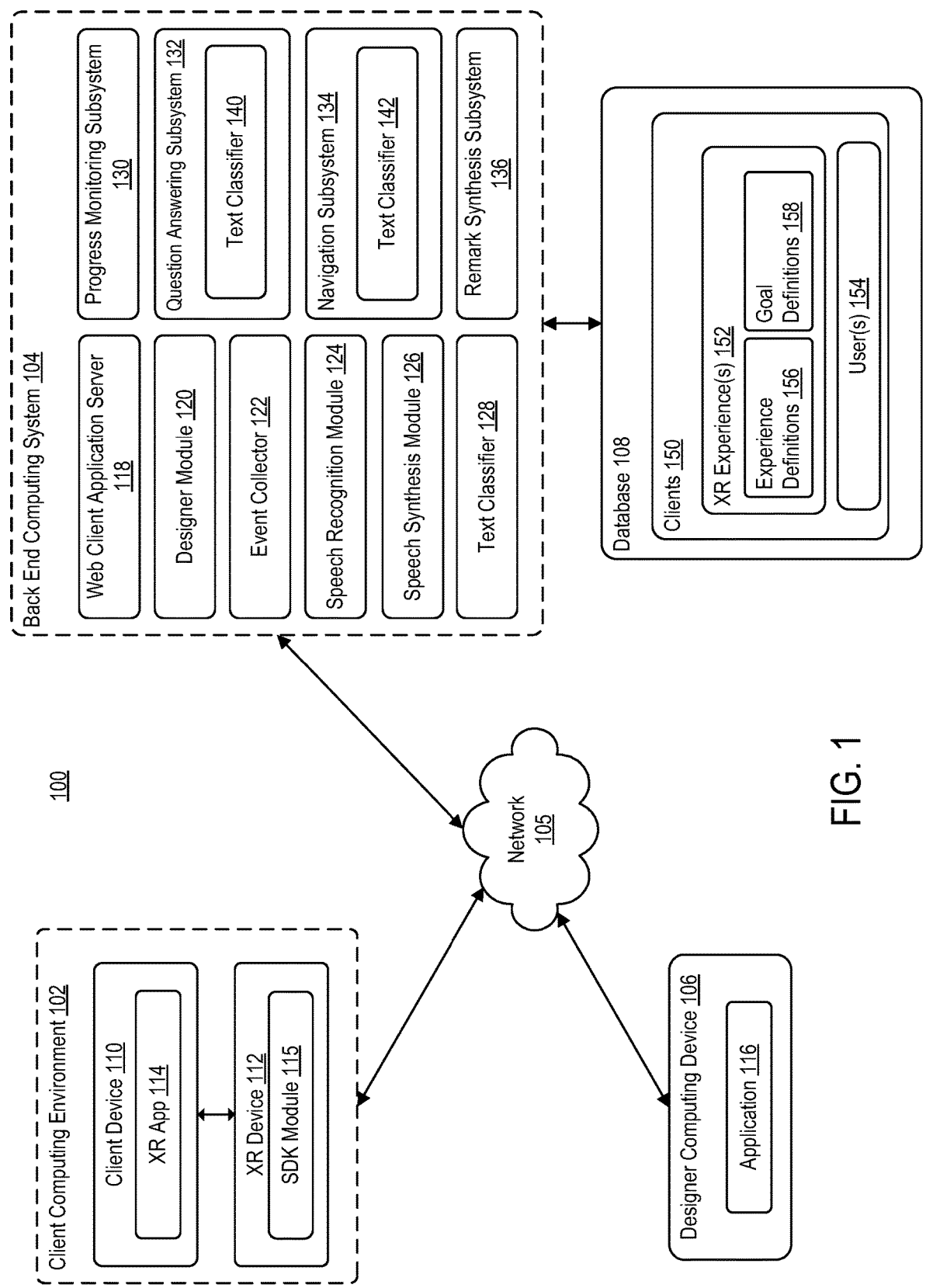
FIG. 1 is a block diagram illustrating a computing environment, according to one embodiment.

The present disclosure is generally related to systems and methods for having interactions with an artificial intelligence agent (e.g., conversational assistant) to guide the achievement of a specific goal in an extended reality (XR) environment or experience. XR may be a broad term that may refer to one or more of virtual reality (VR), augmented reality (AR), or mixed reality (MR). In some embodiments, one or more techniques described herein may provide a goal-driven conversational ("GDC") system for XR. XR experiences may be executed on hardware devices such as headsets that can allow for voice input to be captured.

In some XR experiences, users may be provided with explicit goals to achieve, such as mastering a topic of study or memorizing a procedure. One or more techniques described herein may allow a designer to program a goal for such an experience. Additionally, the present system may allow for a two-way interaction with a conversational assistant, within the XR experience, to guide the user towards the goal, by answering the user's questions, communicating the user's progress, and navigating the user through the tasks needed to achieve success. The system may thus aid the user in completing the tasks in an optimal manner, achieving the goal efficiently.

In some embodiments, a designer may use a computer that communicates with the present system to define an XR experience as a set of tasks. In some embodiments, the designer may use processing logic to associate each task with success criteria defined using events within the XR experience, and may create dependencies between these tasks. In some embodiments, the designer may use processing logic to associate successful completion of each task with completion of one or more subgoals, and may define a goal as a composition of such subgoals. The resulting goal definition and experience definition may be stored in a database associated with the system.

In some embodiments, the XR device on which the experience may be played may send events to the back end system in response to actions taken by the user. Exemplary actions may include, but are not limited to, the user picking up an object in the XR environment, the user shifting their gaze in the XR environment, or the user uttering a statement in the XR environment. The back end system may use these events to evaluate success or failure of tasks and evaluate overall progress towards the goal based on the stored goal definition and experience definition. In some embodiments, the back end computing system may combine the user's progress towards the goal with other useful information to be relayed to the user. For example, the back end computing system may convert the resulting response data into audio using automated speech synthesis (ASS) technology. The synthesized audio may be sent back to the user and played within the XR environment using a virtual assistant to relay, for example, the user's progress status. In some embodiments, the virtual assistant may initiate an interaction with the user without being prompted by the user.

In some embodiments, the XR device on which the experience is played may capture a verbal utterance from the user and send the verbal utterance to back end computing system for further processing.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

FIG. 1 is a block diagram illustrating a computing environment 100, according to one embodiment. Computing environment 100 may include at least a client computing environment 102, a back end computing system 104, a designer computing device 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of computing environment 100.

Client computing environment 102 may include at least client device 110 and extended reality (XR) device 112. In some embodiments, client device 110 may communicate with XR device 112 via a wired connection therebetween. In some embodiments, client device 110 may communicate with XR device 112 via a wireless communication. Client device 110 may be operated by a user. For example, client device 110 may be a mobile device, a tablet, a desktop computer, or any computing system having the capabilities described herein.

Client device 110 may include at least XR application 114. In some embodiments, XR application 114 may be configured to interface with back end computing system 104. XR application 114 may be representative of a web browser that allows access to a website or a stand-alone application. Client device 110 may access application 116 to access functionality of back end computing system 104. Designer computing device 106 may communicate over network 105 to request a virtual reality or augmented reality experience from back end computing system 104. For example, designer computing device 106 may be configured to execute application 116 to access content management by web client application server 118.

XR application 114 may be further configured to interface with XR device 112. For example, XR application 114 may be an application that corresponds to XR device 112. In some embodiments, the content (e.g., XR experience) that is requested from back end computing system 104 may be provided to XR device 112 for execution thereon.

As those skilled in the art recognize, in some embodiments, XR device 112 may be configured to interface directly with back end computing system 104, thus eliminating the need for a separate client device 110.

XR device 112 may be configured to provide an XR experience (e.g., VR, AR, or MR experience) to a user of XR device 112. XR device 112 may be a head-mounted device worn by a user. XR device 112 may be configured to record at least head movements and/or hand movements (generally bodily movements) of the user during the XR experience. In some embodiments, XR device 112 may work in conjunction with XR application 114 executing on client device 110. In some embodiments, XR device 112 may be a stand-alone device, configured to execute a respective XR application (not shown).

XR device 112 may include software development kit (SDK) module 115. SDK module 115 may include an SDK that may be a set of software development tools that allows the creation of application for a certain software package, software framework, hardware platform, computer system, video game console, operating system, and the like. SDK module 115 may be configured to track one or more locations of a user throughout the XR experience. In some embodiments, SDK module 115 may track a movement of a user's head during the XR experience. In some embodiments, SDK module 115 may track a movement of a user's hands during the XR experience. In some embodiments, SDK module 115 may track a movement of a user's gaze during the XR experience. In some embodiments, SDK module 115 may transmit the one or more coordinates of the user to client device 110 for further analysis. In some embodiments, SDK module 115 may transmit the one or more coordinates of the user to back end computing system 104 for further analysis.

Designer computing device 106 may be associated with an entity configured to design an XR experience for one or more users. For example, designer computing device 106 may access functionality of back end computing system 104 to design a XR experience that includes a set of tasks to be completed by a user during the XR experience. Designer computing device 106 may include at least application 116. Application 116 may be representative of a web browser or stand-alone application that allows designer computing device 106 to access to functionality of back end computing system 104. Designer computing device 106 may communicate over network 105 to request a webpage, for example, from web client application server 118 in back end computing system 104. For example, designer computing device 106 may be configured to execute application 116 to access content management by web client application server 118. The content that is displayed to designer computing device 106 may be transmitted from web client application server 118 to designer computing device 106, and subsequently processed by application 116 for display through a graphical user interface (GUI) of designer computing device 106.

Via application 116, a designer or end user may generate an XR experience that includes a goal, goal criteria, and/or subgoals of the XR experience. In some embodiments, a designer or end user may define various tasks that define or make up the XR experience. In some embodiments, each task may be associated with a combination of interactions, movements, physical orientation, gaze, and the like that may be associated with determining a success or failure of a task. Once generated, a user may access the XR experience via client device 110 and/or XR device 112.

Back end computing system 104 may include web client application server 118, designer module 120, event collector 122, speech recognition module 124, speech synthesis module 126, text classifier 128, progress monitoring subsystem 130, question answering subsystem 132, navigation subsystem 134, and remark synthesis subsystem 136.

Each of designer module 120, event collector 122, speech recognition module 124, speech synthesis module 126, text classifier 128, progress monitoring subsystem 130, question answering subsystem 132, navigation subsystem 134, and remark synthesis subsystem 136 may be comprised of one or more software modules. The one or more software modules may be collections of code or instructions stored on a media (e.g., memory of one or more computing systems of back end computing system 104) that represent a series of machine instructions (e.g., program code) that implement one or more algorithmic steps. Such machine instructions may be the actual computer code a processor of one or more computing systems of back end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Designer module 120 may allow a designer or client to design one or more XR experiences for users. For example, as provided above, designer computing device 106 may communicate with back end computing system 104 to define or design an XR experience. In some embodiments, the XR experience may have a set of tasks associated therewith. Designer module 120 may be configured to allow designer computing device 106 to utilize processing logic to associate each task of an XR experience with success criteria using events within the XR experience. In some embodiments, designer module 120 may further allow designer computing device 106 to create dependencies between tasks of an XR experience. In some embodiments, designer module 120 may be configured to allow designer computing device 106 to use processing logic to associate successful completion of each task with completion of one or more subgoals. The one or more subgoals may define a goal to be achieved by an end user during the XR experience.

In some embodiments, once an XR experience is generated, the XR experience may be stored in database 108. As shown, database 108 may be in communication with back end computing system 104. In some embodiments, database 108 may be a component of back end computing system 104. In some embodiments, database 108 may be separate from back end computing system 104 (e.g., hosted on a separate server). Database 108 my include one or more clients 150. Each client 150 may correspond to an entity that may be associated with back end computing system 104. Each client 150 may include one or more XR experiences 152 and one or more users 154. Each XR experience 152 may correspond to an XR experience, such as those designed by designer computing device 106 using application 116. Each XR experience 152 may include experience definitions 156 and goal definitions 158.

In some embodiments, experience definitions 156 may include one or more tasks defined by designer computing device 106. In some embodiments, goal definitions 158 may include one or more goals for each task from experience definitions 156. In some embodiments, goal definitions 158 may include one or more subgoals associated with each goal. Experience and goal definitions may be discussed in more detail below in conjunction with FIGS. 2-3.

Users 154 may correspond to one or more users or subscribers associated with or assigned to an XR experience 152. Generally, each user may correspond to a respective client device 110. In some embodiments, users 154 may store data related to each user's progress in an XR experience. In this manner, a subscriber or client may track a user's interaction with XR experience 152.

Event collector 122 may be configured to collect various data from XR device 112. In some embodiments, each object within the XR environment may be associated with one or more states. Data collected by event collector 122 may include the current states or each object, the position of the user as represented in three-dimensional space, and/or information pertaining to a number of audio or video hints provided to the user as they try to accomplish a task. In some embodiments, event collector 122 may store this data in association with a respective user 154 in database 108. In this manner, event collector 122 may make user data available to other components of back end computing system 104.

Speech recognition module 124 may be configured to handle any speech input provided by XR device 112. For example, XR device 112 may be configured to send audio data to back end computing system 104 during or after a user's interaction with an XR experience. In some embodiments, the audio data may correspond to a spoken utterance by the user. Speech recognition module 124 may be configured to convert the audio data into text using automatic speech recognition (ASR) technology. By converting the audio data into text using ASR technology, speech recognition module 124 may provide the audio data into a format more easily processable by other components of back end computing system 104.

Text classifier 128 may be configured to process text generated by speech recognition module 124 from the audio data. Text classifier 128 may be representative of an artificial intelligence component using natural language understanding (NLU) technology. Text classifier 128 may be configured to derive the intent of the text corresponding to a user's utterance. In some embodiments, text classifier 128 may be trained to classify the intent into one or more categories. Exemplary categories may include, but are not limited to, progress inquiry, a question, or a request to navigate to a task within the XR experience. Depending on how text classifier 128 classifies the request, text classifier 128 may forward the text to one of progress monitoring subsystem 130, question answering subsystem 132, or navigation subsystem 134.

Progress monitoring subsystem 130 may be configured to receive text from text classifier 128. For example, progress monitoring subsystem 130 may be configured to receive text from text classifier 128, responsive to text classifier 128 determining that the user's utterance is associated with a progress inquiry. Progress monitoring subsystem 130 may be configured to produce feedback for the user based on their current state in the XR experience. In some embodiments, progress monitoring subsystem 130 may determine a user's current state in the XR experience based on events collected and stored by event collector 122. For example, progress monitoring subsystem 130 may access database 108 to determine the task the use is currently performing and the user's success and/or failure on the current task. Once progress monitoring subsystem 130 determines the current state of the user in the XR experience, progress monitoring subsystem 130 may generate a response to be transmitted back to client device 110. In some embodiments, the response may be one or more of an audible, visual, or haptic feedback response.

Question answering subsystem 132 may be configured to receive text from text classifier 128. For example, question answering subsystem 132 may be configured to receive text from text classifier 128, responsive to text classifier 128 determining that the user's utterance is associated with a question. Question answering subsystem 132 may be configured to provide a response to an inquiry by the user, based on, for example, the user's current task and question-answer pairs stored in database 108. Once question answering subsystem 132 determines the current state of the user in the XR experience and corresponding answer, question answering subsystem 132 may generate a response to be transmitted back to client device 110. In some embodiments, the response may be one or more of an audible, visual, or haptic feedback response.

Navigation subsystem 134 may be configured to guide the user to a different part of the XR experience using a verbal command. For example, navigation subsystem 134 may be configured to receive text from text classifier 128, responsive to text classifier 128 determining that the user's utterance is associated with a navigational choice. For example, the user may request continuing the XR experience at a different task by saying, or requesting, to repeat the current task an additional time. Depending on whether the user is allowed to repeat a task or navigate to a different task, navigation subsystem 134 may generate a response to be transmitted back to client device 110. In some embodiments, the response may be one or more of an audible, visual, or haptic feedback response.

Remark synthesis subsystem 136 may be configured to receive outputs from one or more of progress monitoring subsystem 130, question answering subsystem 132, and/or navigation subsystem 134. Remark synthesis subsystem 136 may be configured to refine the output by prioritizing an order in which information may be relayed back to the user. For example, remark synthesis subsystem may determine that a question may be answered immediately, followed by a progress status within the same conversational turn. In some embodiments, the determination from remark synthesis subsystem 136 may be transmitted to speech synthesis module 126.

Speech synthesis module 126 may be configured to convert output from remark synthesis subsystem 136 into audio. In some embodiments, the audio data may be sent over network 105 to XR device 112 and/or client device 110, where the audio may be relayed to the user by a conversational assistant that is present in the XR environment.

Figure 2:
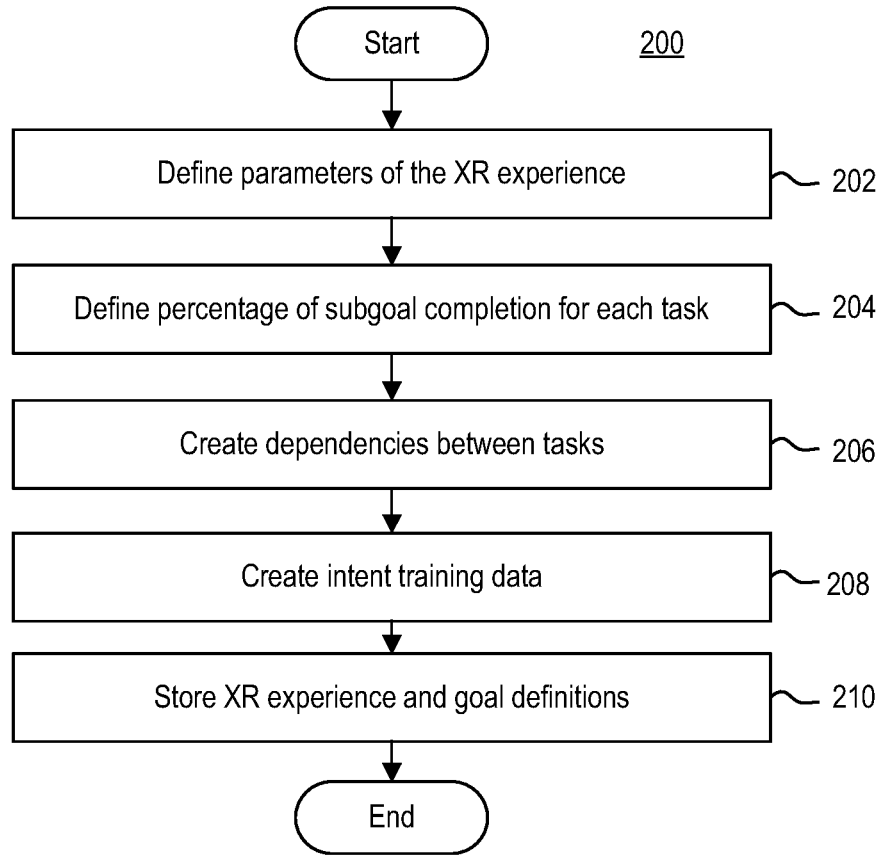
FIG. 2 is a flow diagram illustrating a method of generating an XR experience, according to example embodiments.

FIG. 2 is a flow diagram illustrating a method 200 of generating an XR experience, according to example embodiments. Method 200 may begin at step 202.

At step 202, designer computing device 106 may define one or more parameters associated with an XR experience. For example, designer computing device 106 may access functionality of back end computing system 104 via application 116 executing thereon. Designer computing device 106 may initiated the process logic for designer module 120 to generate an XR experience. In some embodiments, designer computing device 106 may define one or more of a goal, goal criteria, and/or subgoals of the XR experience. In some embodiments, designer computing device 106 may also define one or more tasks that make up the XR experience. Designer computing device 106 may specify each task using criteria that may include a combination of interactions, movements, physical orientation, and/or gaze in the XR environment that may determine a success or failure of the task.

At step 204, designer computing device 106 may define a percentage of subgoal completion for each task. For example, designer computing device 106 may define how task success may influence the achievement of subgoals defined in step 202. For example, successful completion of a task results in some percentage of one or more subgoals being achieved. In some embodiments, designer computing device 106 may perform such operation for each task in the XR experience.

At step 206, designer computing device 106 may create one or more dependencies between tasks. For example, designer computing device 106 may define a flow through the XR experience by creating dependencies between the tasks. Such dependencies may restrict the order in which a user may be permitted to attempt a task in the XR environment.

At step 208, designer computing device 106 may create intent training data for the XR experience. For example, designer computing device 106 may specify the intent training data for various classification models (e.g., text classifier 128). In some embodiments, the intent training data may include a set of textual phrases that refer to each intent. For example, if the intent to be trained involves a user checking their progress in the experience, the training data may include phrases such as, but not limited to, "How am I doing?", "When will I finish?", "Was that done properly?", and the like.

At step 210, designer computing device 106 may cause back end computing system 104 to store the XR experience and goal definitions in database 108. For example, designer module 120 may store the data corresponding to each experience definition and goal definition in database 108.

Figure 3:
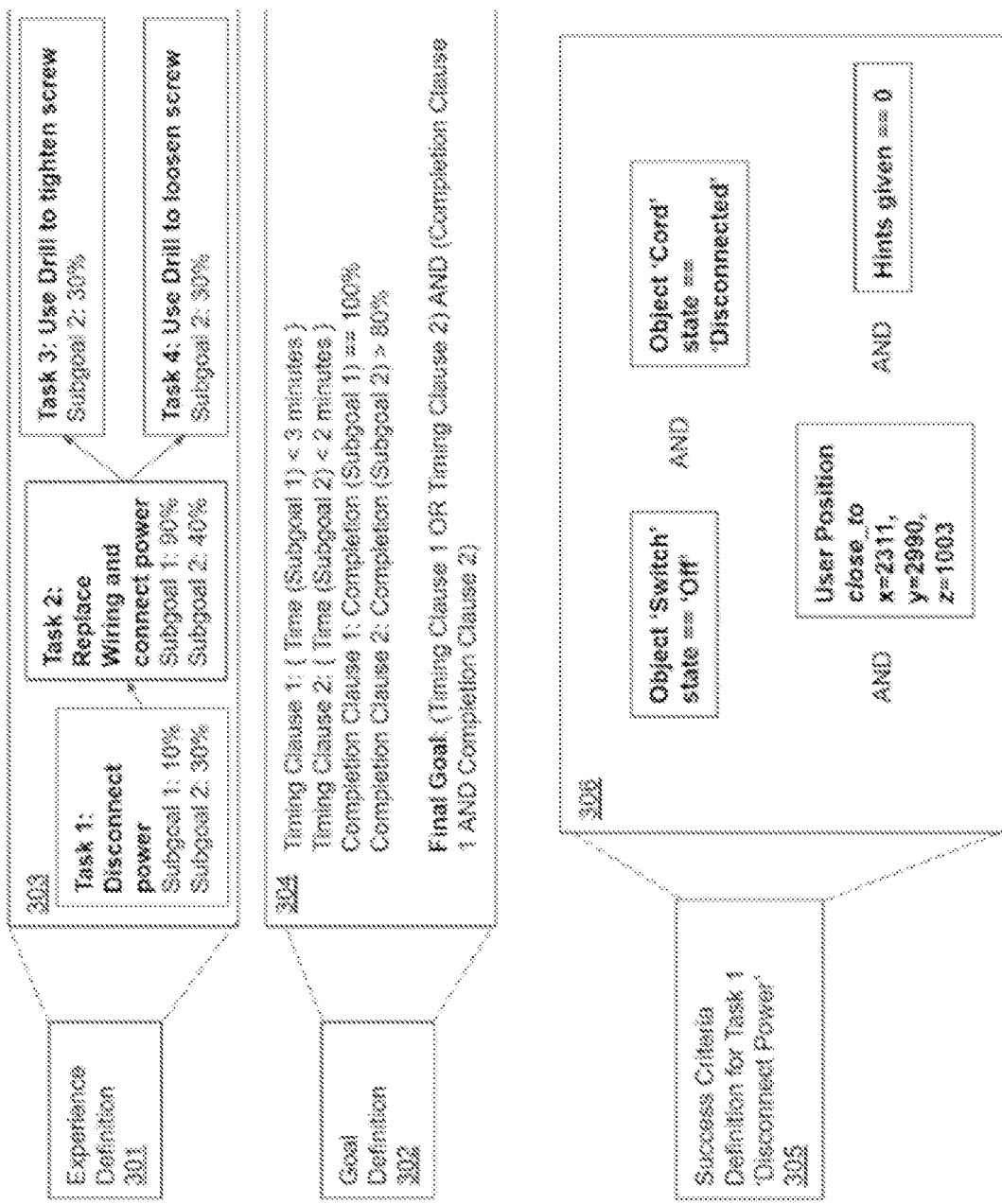
FIG. 3 is a block diagram illustrating an exemplary framework of an XR experience, according to example embodiments.

FIG. 3 is a block diagram illustrating an exemplary framework 300 of an XR experience, according to example embodiments. As discussed in conjunction with FIG. 2, designer computing device 106 may interface with back end computing system 104 to generate an XR experience. As shown, framework 300 may include an experience definition 301 and goal definition 302. Experience definition 301 may correspond to an XR experience such as that discussed above in conjunction with FIG. 2. Framework 300 may illustrate how success criteria for the tasks making up the XR experience may be defined. Although the present discussion is focused on an XR experience in which a user is taught to replace the wiring in a faulty electric drill, those skilled in the art may recognize that an XR experience is not limited to such subject matter.

As shown, experience definition 301 may include a set of tasks 303. Set of tasks 303 may include Task 1, Task 2, Task 3, and Task 4. Task 1 may focus on disconnecting the power before the wiring is replaced. As shown, Task 1 may include one or more subgoals: Subgoal 1 and Subgoal 2. Subgoal 1 may focus on user knowledge of wiring; Subgoal 2 may focus one knowledge of an electric drill. The designer can specify how the task success or failure may impact the completion of a subgoal. For example, Task 1 may cover 10% of subgoal 1 and 30% of subgoal 2. Similarly, designer computing device 106 may specify definitions for other tasks within the XR experience.

In some embodiments, as part of the experience definition, designer computing device 106 may also specify success criteria for each task. For example, Task 1 ("Disconnect Power") may be considered successfully completed, as shown in 305 if multiple conditions are met as detailed in 306: the "Switch" object, referring to the switch associated with the drill in the XR environment, would have to be in the "Off" state; the "Cord" object, representing the power cord in the environment, would have to be in the "Disconnected" state; the user would have to be in a specific position within the environment after completing these tasks, and the number of hints provided during the course of the task would have to be zero. These conditions would be evaluated based on the events being sent continuously by XR device 112.

In addition to defining the tasks within the experience definition, in some embodiments, designer computing device 106 may specify the goal definition as a combination of four clauses. Each clause refers to a state of a subgoal that has been defined. In some embodiments, there may be two types of clauses, completion clauses and timing clauses. Completion clauses may refer to the percentage completion of Subgoal 1, which may be required to be 100% for the overall goal to be met, and the percentage competition of Subgoal 2, which may be required to be at least 80%. Timing clauses may refer to the time taken for subgoals to be completed, which may be indicated here as less than 3 minutes for Subgoal 1 and less than 2 minutes for Subgoal 2. In some embodiments, these clauses may be combined using an expression to define the final goal for the XR experience. In some embodiments, the final goal may require that either of the timing clauses or both completion clauses be satisfied. Thus, the experience definition and goal definition may provide a framework for evaluation of progress and to drive a discussion between the conversational assistant and the user.

As those skilled in the art recognize, the above description is exemplary in nature. Other examples may define an experience and/or a goal differently.

Figure 4:
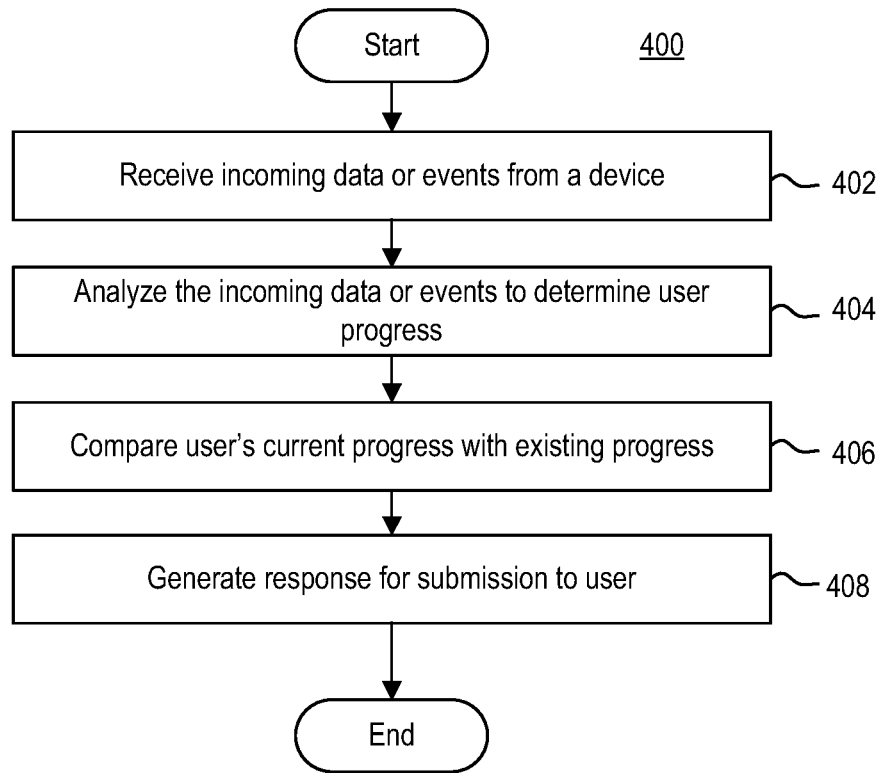
FIG. 4 is a flow diagram illustrating a method of generating feedback for a user, according to example embodiments.

FIG. 4 is a flow diagram illustrating a method 400 of generating feedback for a user based on their current state in the XR experience and their progress against a goal, according to example embodiments. Method 400 may begin at step 402.

At step 402, back end computing system 104 may receive incoming data or events from a device associated with the user. In some embodiments, back end computing system 104 may receive incoming data or events received from XR device 112. In some embodiments, back end computing system 104 may process incoming data or events received from client device 110. For example, event collector 122 may receive may receive data from one or more of XR device 112 or client device 110. Such data may include, but is not limited to, the current states or each object, the position of the user as represented in three-dimensional space, and/or information pertaining to a number of audio or video hints provided to the user as they try to accomplish a task.

At step 404, back end computing system 104 may analyze the incoming data or events to determine user progress within the XR experience. Progress monitoring subsystem 130 may analyze the incoming data or events to determine the task that the user is currently performing and their success or failure on the current task. Referring back to the specific example discussed above in conjunction with FIG. 3, progress monitoring subsystem 130 may receive data indicating that the user interacted with the drill object in the XR environment to switch the drill object off and disconnect it from the power source. This may result in processing logic marking the completion of the task and noting that it was successfully completed.

In some embodiments, progress monitoring subsystem 130 may use the incoming data or events to evaluate the subgoal completion, as well as time taken for completion. Referring again to the example discussed above in conjunction with FIG. 3, upon receiving events indicating that Task 1 is successfully completed, progress monitoring subsystem 130 may analyze the data or events to determine that 10% of subgoal 1 and 30% of subgoal 2 may be completed.

At step 406, back end computing system 104 may compare the user's current progress with existing progress within the XR experience. In some embodiments, progress monitoring subsystem 130 may evaluate the clauses that make up the final goal. Continuing with the above example, the clauses may require subgoal 1 to be 100% complete. As such, progress monitoring subsystem 130 may determine that the goal has not yet been reached.

At step 408, back end computing system 104 may generate a response for submission to the user. In some embodiments, the response may be one or more of an audible, visual, or haptic feedback response. For example, evaluation of the user's progress may lead to the generation of an appropriate response that communicates the progress and status to the user. For example, referring again to the above example of FIG. 3, progress monitoring subsystem 130 may generate a response, such as: "Well done on making sure that the drill is safely disconnected. Let's move on to the next task, you're doing great!" Progress monitoring subsystem 130 may cause back end computing system 104 to deliver this message to the user in the XR environment.

Figure 5:
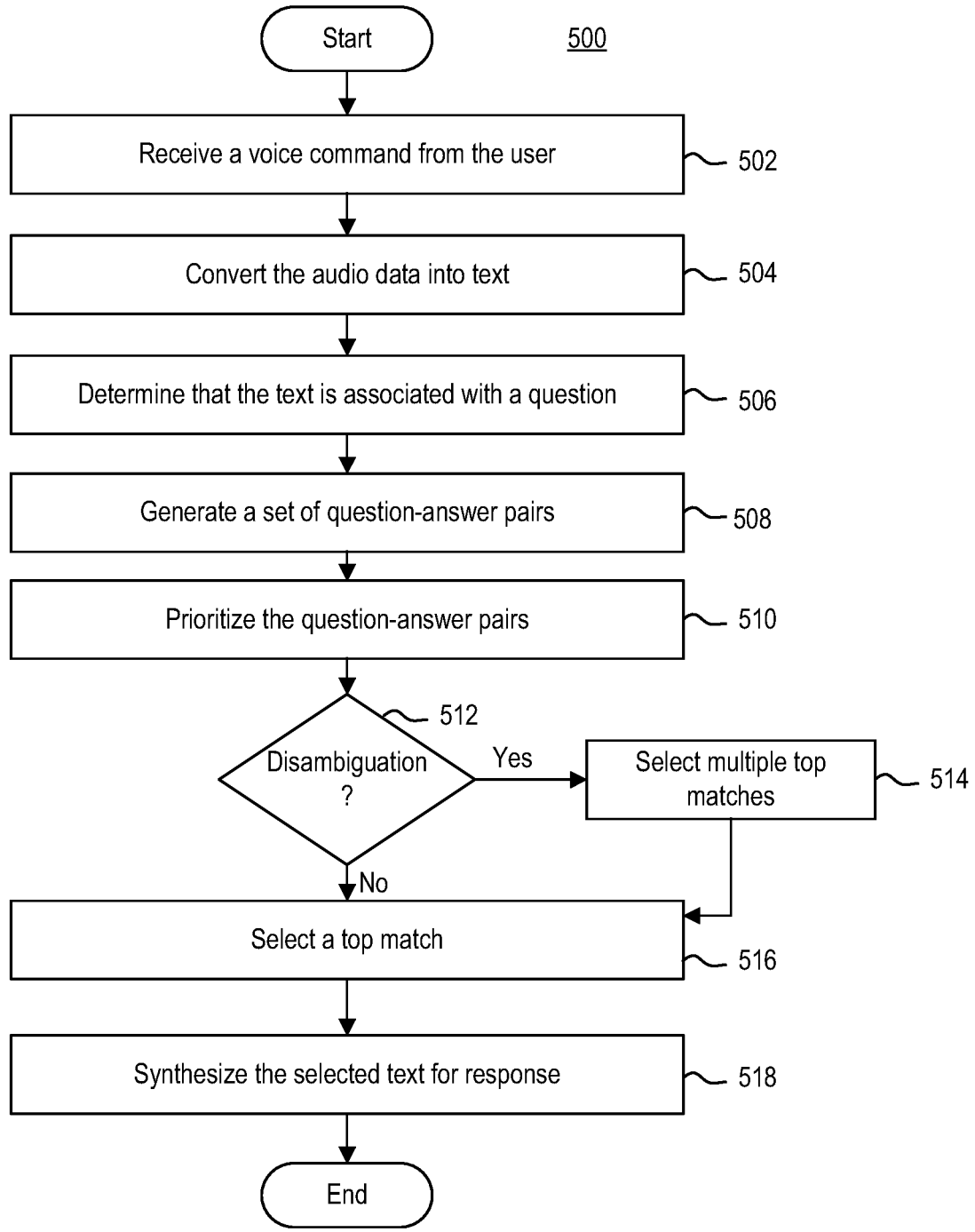
FIG. 5 is a flow diagram illustrating a method answering user questions during the XR experience, according to example embodiments.

FIG. 5 is a flow diagram illustrating a method 500 answering user questions during the XR experience, according to example embodiments. Method 500 may begin at step 502.

At step 502, back end computing system 104 may receive a voice command from a user. For example, during the XR experience, a user may ask a virtual assistant within the XR experience a question. In some embodiments, XR device 112 may transmit audio data reflective of the question to back end computing system 104 during or after a user's interaction with an XR experience.

At step 504, back end computing system 104 may convert the audio data into text. For example, speech recognition module 124 may convert the audio data into text using ASR technology. By converting the audio data into text using ASR technology, speech recognition module 124 may provide the audio data into a format more easily processable by other components of back end computing system 104.

At step 506, back end computing system 104 may determine that the text is associated with a question. For example, text classifier 128 may derive the intent of the text corresponding to a user's utterance. In some embodiments, text classifier 128 may be trained to classify the intent into one or more categories. Exemplary categories may include, but are not limited to, progress inquiry, a question, or a request to navigate to a task within the XR experience.

At step 508, back end computing system 104 may generate a set of question-answer pairs based on the text. For example, responsive to determining that the text may be associated with a question, text classifier 128 may forward the request to question answering subsystem 132. In some embodiments, question answering subsystem 132 may utilize text classification model 140 to process the user's question. For example, text classification model 140 may be trained to understand which question the user's utterance may refer to, using NLU technology trained on the intent training data. In some embodiments, the output of text classification model 140 may be a set of question-answer pairs representing close matches to the user's query. In some embodiments, the output may further include a confidence level associated with each of the matched pairs. In some embodiments, text classification model 140 may receive, as an additional input, the current task undertaken by the user, so that the resulting match takes into consideration the context of the user's question.

At step 510, back end computing system 104 may prioritize the question-answer pairs. For example, question answering subsystem 132 may prioritize the question-answer pairs based on the user's current task and confidence level of each match. In some embodiments, the highest priority match may have much higher confidence than the others and may be a clear match. In some embodiments, there may be multiple question-answer pairs at the top of the priority list that are close to each other in matching confidence.

At step 512, back end computing system 104 may determine whether disambiguation may be needed based on the ranking of question-answer pairs. For example, question answering subsystem 132 may use an internal threshold evaluation of closeness to determine whether disambiguation between closely matching pairs may be needed. If at step 512, question answering subsystem 132 determines that disambiguation is needed, then method 500 may proceed to step 514. At step 514, question answering subsystem 132 may select multiple top matches from the question-answer pairs.

If, however, at step 512, question answering subsystem 132 determines that disambiguation is not needed, method 500 may proceed to step 516. At step 516, back end computing system 104 may select a response to the user's question based on a top ranked question-answer pair. In some embodiments, the response may be one or more of an audible, visual, or haptic feedback response.

At step 518, back end computing system 104 may synthesize the selected text for response and may cause the response to be presented to the user within the XR environment.

Referring to the embodiment and example in FIG. 3, a user may ask a question such as "How do I turn the drill off?" In response, question answering subsystem 132 may match this question with high confidence to the intent "user_asking_about_drill_power_switch" using text classification model 140. Question answering subsystem 132 may identify a top ranked response, such as "Great question! You can turn off the drill using the on/off switch on the side of the handle. Try it!"

If disambiguation is needed, question answering subsystem 132 may select one or more options from the highest confidence matches. For example, if the user asks "How do I stop this?" the question answering subsystem 132 may match this question with roughly equal confidence to multiple question-answer pairs. For example, back end computing system 104 may respond with a response such as "I'm sorry, I wasn't sure what you meant. Were you asking me 'How do I turn off the drill?', or 'How do I quit this experience?'"

Figure 6:
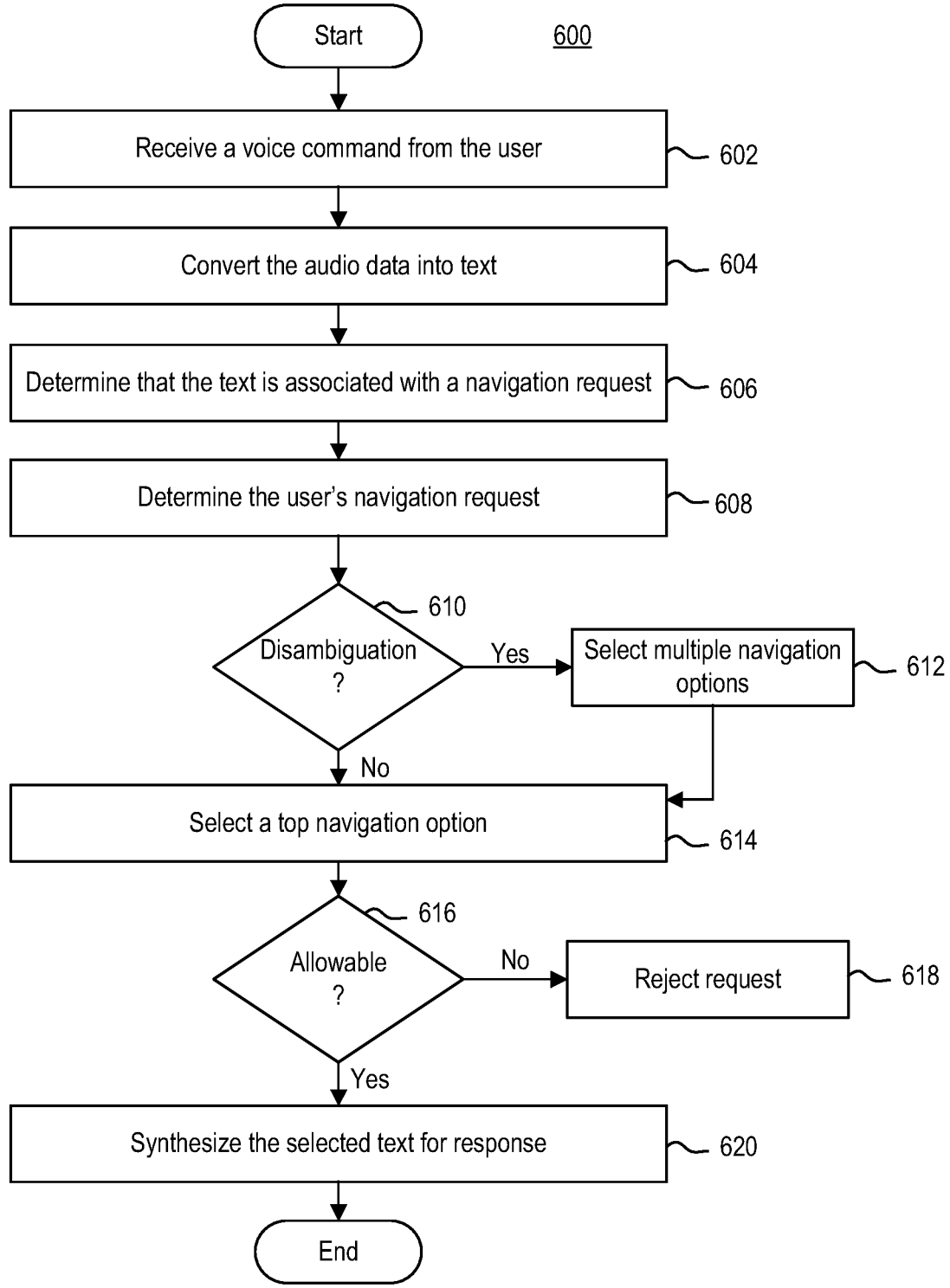
FIG. 6 is flow diagram illustrating a method of guiding a user to a portion of an XR experience, according to example embodiments.

FIG. 6 is flow diagram illustrating a method 600 of guiding a user to a portion of an XR experience, according to example embodiments. Method 600 may begin at step 602.

At step 602, back end computing system 104 may receive a voice command from a user. For example, during the XR experience, a user may ask a virtual assistant within the XR experience to navigate to a portion of an XR experience or replay a task within the XR experience. In some embodiments, XR device 112 may transmit audio data reflective of voice command to back end computing system 104 during or after a user's interaction with an XR experience.

At step 604, back end computing system 104 may convert the audio data into text. For example, speech recognition module 124 may convert the audio data into text using ASR technology. By converting the audio data into text using ASR technology, speech recognition module 124 may provide the audio data into a format more easily processable by other components of back end computing system 104.

At step 606, back end computing system 104 may determine that the text is associated with a request to navigate to a portion of the XR experience. For example, text classifier 128 may derive the intent of the text corresponding to a user's utterance. In some embodiments, text classifier 128 may be trained to classify the intent into one or more categories. Exemplary categories may include, but are not limited to, progress inquiry, a question, or a request to navigate to a task or other portion within the XR experience.

At step 608, back end computing system 104 may determine a user's navigational request. For example, responsive to determining that the text may be associated with a request to navigate to a task or other portion of the XR experience, text classifier 128 may forward the request to navigation subsystem 134. In some embodiments, navigation subsystem 134 may utilize text classification model 142 to process the user's request. For example, text classification model 142 may be trained based on the intent training data and NLU technology to determine the user's navigational choice. In some embodiments, the user may request continuing the experience at a different task by requesting to repeat the current task one more time.

At step 610, back end computing system 104 may determine whether disambiguation is needed. For example, text classification model 142 may not be able to clearly map the user's request to a specific task. If, at step 610, navigation subsystem 134 determines that disambiguation is needed, then method 600 may proceed to step 612. At step 612, navigation subsystem 134 may select multiple navigation options for the user.

If, however, at step 610, navigation subsystem 134 may determine that disambiguation is not needed, method 600 may proceed to step 614. At step 614, back end computing system 104 may select a navigation option based on the user's request.

At step 616, back end computing system 104 may determine whether the user's navigational request may be allowable. To determine whether the user's navigational request may be allowable, navigation subsystem 134 may check the task's dependencies to determine whether the task had any prerequisites based on the experience definition. If, at step 616, back end computing system 104 determines that the user's navigation request is not allowable, then method 600 may proceed to step 618. At step 618, back end computing system 104 may generate a response rejecting the user's request. In some embodiments, the response may be one or more of an audible, visual, or haptic feedback response.

If, however, at step 616, back end computing system 104 determines that the user's navigation request is allowable, then method 600 may proceed to step 620. At step 620, back end computing system 104 may synthesize the selected text for response and may cause the response to be presented to the user within the XR environment. In some embodiments, the response may be one or more of an audible, visual, or haptic feedback response. For example, navigation subsystem 134 may respond with acknowledgement of the task the user will be then transitioned.

Continuing with the example described above in conjunction with FIG. 3, if the user unsuccessfully completed task 2, the user may ask "Could I try redoing the wiring again?" In some embodiments, navigation subsystem 134 may generate the response "Sure, let's go back and reattempt the task to replace the wiring and connect power to the drill".

Figure 7A:
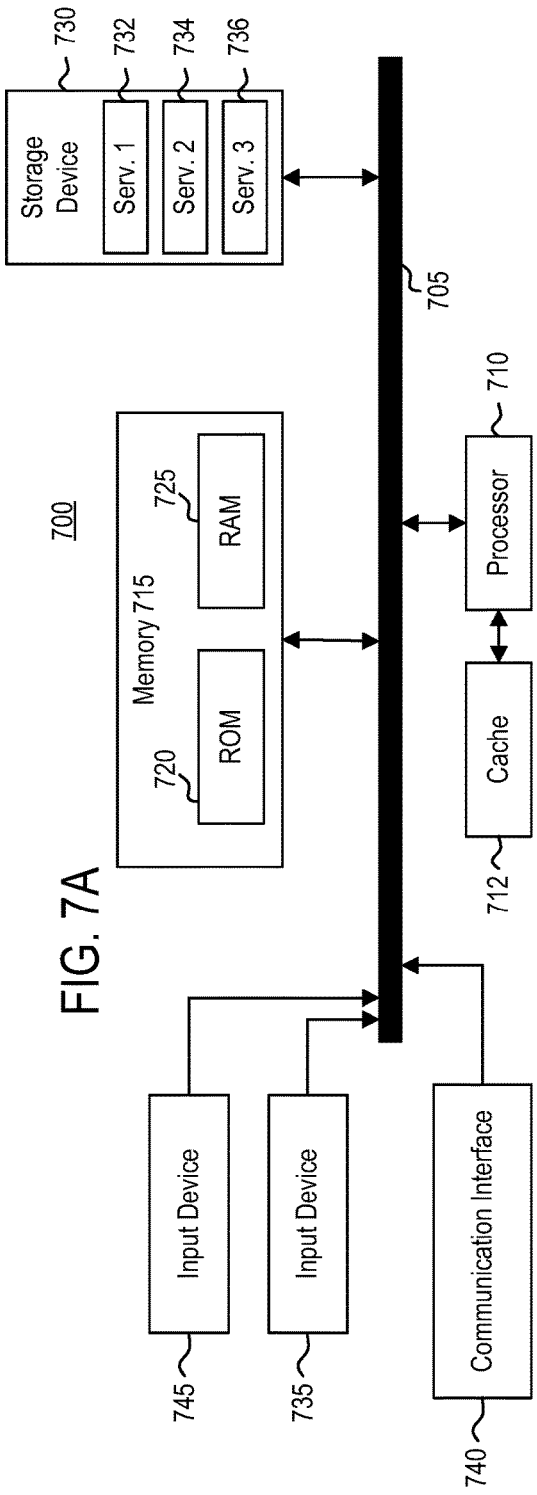
FIG. 7A illustrates a system bus computing system architecture, according to example embodiments.

FIG. 7A illustrates an architecture of a computing system 700, according to example embodiments. System 700 may be representative of at least a portion of back end computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general-purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with system 700, an input device 745 may represent any number of input mechanisms, such as a microphone for speech, a touch-sensitive screen for gesture or graphical input, keyboard, mouse, motion input, speech and so forth. An output device 735 may also be one or more of a number of output mechanisms known to those of skill in the art. In some instances, multimodal systems may enable a user to provide multiple types of input to communicate with system 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, output device 735 (e.g., display), and so forth, to carry out the function.

Figure 7B:
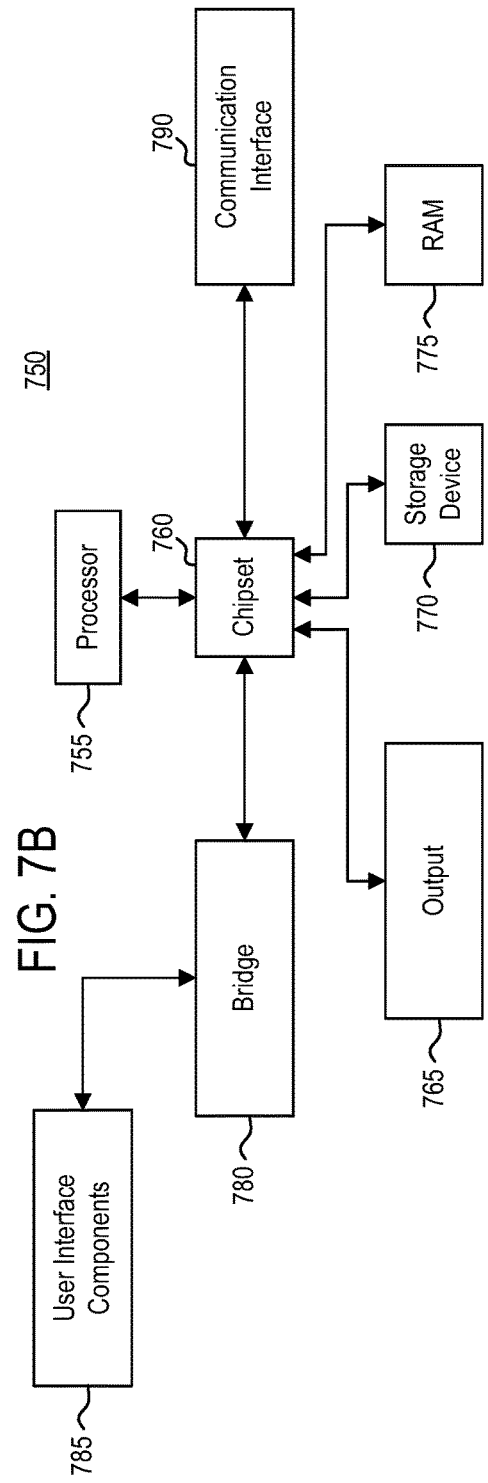
FIG. 7B illustrates a computer system having a chipset architecture that may represent at least a portion of back end computing system, according to example embodiments To facilitate understanding, identical reference numerals have been used, where possible, to designate identical elements that are common to the figures. It is contemplated that elements disclosed in one embodiment may be beneficially utilized on other embodiments without specific recitation.

FIG. 7B illustrates a computer system 750 having a chipset architecture that may represent at least a portion of back end computing system 104, according to example embodiments. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage 770, which may include magnetic media, and solid state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage 770 or 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method, comprising:
   generating, by a computing system, an extended reality environment for an end user, the extended reality environment comprising a plurality of tasks and a plurality of goals to be achieved by the end user;
   receiving, by the computing system, input data from an extended reality system associated with the end user, the input data comprising at least event data associated with actions taken by the end user in the extended reality environment;
   updating, by the computing system, a progress of the end user through the plurality of tasks and the plurality of goals based on the input data;
   receiving, by the computing system, a voice command from the end user, wherein the voice command corresponds to a statement uttered by the end user within the extended reality environment, the statement comprising a request related to the progress of the end user through the plurality of tasks and the plurality of goals;
   processing, by the computing system, the voice command to generate a response to the voice command based on end user activity within the extended reality environment, the response providing feedback related to the request; and
   causing, by the computing system, the response to appear within the extended reality environment as an audible, visual, or haptic feedback response to the voice command.

2. The computer-implemented method of claim 1, wherein processing, by the computing system, the voice command to generate the response to the voice command comprises:
   determining that the request related to the progress of the end user through the plurality of tasks and the plurality of goals is associated with a question regarding a task of the plurality of tasks or a goal of the plurality of goals within the extended reality environment;
   generating a plurality of question-answer pairs based on the voice command; and
   selecting a highest ranking question-answer pair of the plurality of question-answer pairs for the response to the voice command.

3. The computer-implemented method of claim 2, wherein generating the plurality of question-answer pairs based on the voice command comprises:
   applying natural language understanding technology to the voice command to determine an intent of the voice command; and
   generating a confidence level for each question-answer pair of the plurality of question-answer pairs.

4. The computer-implemented method of claim 1, wherein processing, by the computing system, the voice command to generate the response to the voice command comprises:
   determining that the request related to the progress of the end user through the plurality of tasks and the plurality of goals is associated with a request is to navigate to a specific portion of the extended reality environment;
   determining that the end user is permitted to navigate to the specific portion of the extended reality environment; and
   generating the response granting the request to navigate to the specific portion of the extended reality environment.

5. The computer-implemented method of claim 4, wherein determining that the end user is permitted to navigate to the specific portion of the extended reality environment comprises:
   identifying one or more dependencies of a task corresponding to the specific portion of the extended reality environment; and
   determining that the end user has satisfied all prerequisites associated with the one or more dependencies.

6. The computer-implemented method of claim 1, wherein updating, by the computing system, the progress of the end user through the plurality of tasks and the plurality of goals based on the input data comprises:
  determining a success or failure of a task or goal based on positional information of the end user in the extended reality environment.

7. The computer-implemented method of claim 1, further comprising:
  converting, by the computing system, the voice command into text using automated speech recognition technology.

8. A non-transitory computer readable medium comprising one or more sequences of instructions, which, when executed by one or more processors, may cause a computing system to perform operations comprising:
  generating, by the computing system, an extended reality environment for an end user, the extended reality environment comprising a plurality of tasks and a plurality of goals to be achieved by the end user;
  receiving, by the computing system, input data from an extended reality system associated with the end user, the input data comprising at least event data associated with actions taken by the end user in the extended reality environment;
  updating, by the computing system, a progress of the end user through the plurality of tasks and the plurality of goals based on the input data;
  receiving, by the computing system, a voice command from the end user, wherein the voice command corresponds to a statement uttered by the end user within the extended reality environment, the statement comprising a request related to the progress of the end user through the plurality of tasks and the plurality of goals;
  processing, by the computing system, the voice command to generate a response to the voice command based on end user activity within the extended reality environment, the response providing feedback related to the request; and
  causing, by the computing system, the response to appear within the extended reality environment as an audible, visual, or haptic feedback response to the voice command.

9. The non-transitory computer readable medium of claim 8, wherein processing, by the computing system, the voice command to generate the response to the voice command comprises:
  determining that the request related to the progress of the end user through the plurality of tasks and the plurality of goals is associated with a question regarding a task of the plurality of tasks or a goal of the plurality of goals within the extended reality environment;
  generating a plurality of question-answer pairs based on the voice command; and
  selecting a highest ranking question-answer pair of the plurality of question-answer pairs for the response to the voice command.

10. The non-transitory computer readable medium of claim 9, wherein generating the plurality of question-answer pairs based on the voice command comprises:
  applying natural language understanding technology to the voice command to determine an intent of the voice command; and
  generating a confidence level for each question-answer pair of the plurality of question-answer pairs.

11. The non-transitory computer readable medium of claim 8, wherein processing, by the computing system, the voice command to generate the response to the voice command comprises:
  determining that the request related to the progress of the end user through the plurality of tasks and the plurality of goals is associated with a request to navigate to a specific portion of the extended reality environment;
  determining that the end user is permitted to navigate to the specific portion of the extended reality environment; and
  generating the response granting the request to navigate to the specific portion of the extended reality environment.

12. The non-transitory computer readable medium of claim 11, wherein determining that the end user is permitted to navigate to the specific portion of the extended reality environment comprises:
  identifying one or more dependencies of a task corresponding to the specific portion of the extended reality environment; and
  determining that the end user has satisfied all prerequisites associated with the one or more dependencies.

13. The non-transitory computer readable medium of claim 8, wherein updating, by the computing system, the progress of the end user through the plurality of tasks and the plurality of goals based on the input data comprises:
  determining a success or failure of a task or goal based on positional information of the end user in the extended reality environment.

14. The non-transitory computer readable medium of claim 8, further comprising:
  converting, by the computing system, the voice command into text using automated speech recognition technology.

15. A system, comprising:
  a processor in communication with an extended reality device; and
  a memory having programming instructions stored thereon, which, when executed by the processor, causes the system to perform operations comprising:
  generating an extended reality environment for an end user, the extended reality environment comprising a plurality of tasks and a plurality of goals to be achieved by the end user;
  receiving input data from an extended reality system associated with the end user, the input data comprising at least event data associated with actions taken by the end user in the extended reality environment;
  updating a progress of the end user through the plurality of tasks and the plurality of goals based on the input data;
  receiving a voice command from the end user, wherein the voice command corresponds to a statement uttered by the end user within the extended reality environment, the statement comprising a request related to the progress of the end user through the plurality of tasks and the plurality of goals;
  processing the voice command to generate a response to the voice command based on end user activity within the extended reality environment, the response providing feedback related to the request; and
  causing the response to appear within the extended reality environment as an audible, visual, or haptic feedback response to the voice command.

16. The system of claim 15, wherein processing the voice command to generate the response to the voice command comprises:
- determining that the request related to the progress of the end user through the plurality of tasks and the plurality of goals is associated with a question regarding a task of the plurality of tasks or a goal of the plurality of goals within the extended reality environment;
- generating a plurality of question-answer pairs based on the voice command; and
- selecting a highest ranking question-answer pair of the plurality of question-answer pairs for the response to the voice command.

17. The system of claim 16, wherein generating the plurality of question-answer pairs based on the voice command comprises:
- applying natural language understanding technology to the voice command to determine an intent of the voice command; and
- generating a confidence level for each question-answer pair of the plurality of question-answer pairs.

18. The system of claim 15, wherein processing the voice command to generate the response to the voice command comprises:
- determining that the request related to the progress of the end user through the plurality of tasks and the plurality of goals is associated with a request to navigate to a specific portion of the extended reality environment;
- determining that the end user is permitted to navigate to the specific portion of the extended reality environment; and
- generating the response granting the request to navigate to the specific portion of the extended reality environment.

19. The system of claim 18, wherein determining that the end user is permitted to navigate to the specific portion of the extended reality environment comprises:
- identifying one or more dependencies of a task corresponding to the specific portion of the extended reality environment; and
- determining that the end user has satisfied all prerequisites associated with the one or more dependencies.

20. The system of claim 15, wherein updating the progress of the end user through the plurality of tasks and the plurality of goals based on the input data comprises:
- determining a success or failure of a task or goal based on positional information of the end user in the extended reality environment.

* * * * *